US012395836B2

(12) United States Patent
Balmakhtar et al.

(10) Patent No.: US 12,395,836 B2
(45) Date of Patent: Aug. 19, 2025

(54) SMART CONTRACT FILTRATION IN A WIRELESS COMMUNICATION SYSTEM

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 202 days.

(21) Appl. No.: 18/194,040

(22) Filed: Mar. 31, 2023

(65) Prior Publication Data

US 2024/0334183 A1 Oct. 3, 2024

(51) Int. Cl.
*H04L 29/06* (2006.01)
*H04W 12/033* (2021.01)

(52) U.S. Cl.
CPC .................. *H04W 12/033* (2021.01)

(58) Field of Classification Search
None
See application file for complete search history.

(56) References Cited

U.S. PATENT DOCUMENTS

| | | | |
|---|---|---|---|
| 10,831,530 B2 | 11/2020 | De Caro et al. | |
| 10,929,823 B2 | 2/2021 | Klarman et al. | |
| 10,949,548 B2 | 3/2021 | Mahatwo et al. | |
| 11,080,247 B2 | 8/2021 | Padmanabhan | |
| 11,157,484 B2 | 10/2021 | Padmanabhan et al. | |
| 11,399,284 B1* | 7/2022 | Haleem | H04W 12/033 |
| 11,770,263 B1* | 9/2023 | Singh | H04L 9/3247 |
| | | | 713/168 |
| 2018/0329693 A1* | 11/2018 | Eksten | G06F 8/65 |
| 2019/0019168 A1* | 1/2019 | Wu | G06F 21/6254 |
| 2019/0068365 A1 | 2/2019 | Wright et al. | |
| 2019/0253434 A1* | 8/2019 | Biyani | H04L 9/3297 |
| 2019/0370792 A1 | 12/2019 | Lam | |
| 2019/0377806 A1 | 12/2019 | Padmanabhan et al. | |

(Continued)

OTHER PUBLICATIONS

Gong, Xinglin et al. Blockchain-Based IoT Application Using Smart Contracts: Case Study of M2M Autonomous Trading. 2020 5th International Conference on Computer and Communication Systems (ICCCS). https://ieeexplore.ieee.org/stamp/stamp.jsp?tp=&arnumber=9118549 (Year: 2020).*

(Continued)

*Primary Examiner* — Jeremiah L Avery

(57) ABSTRACT

In a wireless communication system, wireless communication devices filter smart contract data. The wireless communication devices generate source smart contract outputs. The wireless communication devices select some of the source smart contract outputs. The wireless communication devices select at least one target smart contract. The wireless communication devices transfer the selected source contract outputs to the ones of the selected target smart contracts. The selections that comprise this filtering may be based on device location, device identifier, digital certificates, device application identifiers, device component identifiers, alarms, messages, time, day, date, and/or some other factors.

20 Claims, 13 Drawing Sheets

(56) References Cited

U.S. PATENT DOCUMENTS

| | | |
|---|---|---|
| 2020/0285631 A1 | 9/2020 | Irazabal et al. |
| 2020/0374300 A1 | 11/2020 | Manevich et al. |
| 2021/0021407 A1* | 1/2021 | Weerasinghe ........ H04L 9/3218 |
| 2022/0215471 A1* | 7/2022 | Simpson ............... G06F 3/0346 |
| 2023/0095965 A1* | 3/2023 | Mee ...................... H04L 9/0643 713/168 |
| 2023/0098246 A1* | 3/2023 | Simpson ............... G06F 1/1632 707/703 |
| 2023/0188353 A1* | 6/2023 | El Khiyaoui ....... H04L 63/0421 713/168 |
| 2023/0188355 A1* | 6/2023 | Collins ................ H04L 9/3297 713/168 |
| 2023/0188368 A1* | 6/2023 | Bertin ...................... H04L 9/50 713/168 |
| 2023/0208640 A1* | 6/2023 | El Khiyaoui ......... H04L 9/3247 713/168 |
| 2023/0214370 A1* | 7/2023 | Michaelis ............... H04L 63/12 |
| 2023/0246804 A1* | 8/2023 | Lupowitz ................. H04L 9/00 713/168 |
| 2023/0261863 A1* | 8/2023 | Gutierrez-Sheris ......................... H04L 9/3239 713/168 |
| 2023/0382567 A1* | 11/2023 | Mozumdar .......... B64G 1/1085 |
| 2024/0113902 A1* | 4/2024 | Michaelis ............. H04L 9/0825 |
| 2024/0220939 A1* | 7/2024 | Ropel .................... G06Q 10/20 |
| 2024/0220977 A1* | 7/2024 | Ropel .................. G06Q 20/389 |
| 2025/0124506 A1* | 4/2025 | Tarmann ................ G06Q 50/16 |

OTHER PUBLICATIONS

Mhamdi, Halima et al. Smart contracts for decentralized vehicle services. 2021 International Wireless Communications and Mobile Computing (IWCMC). https://ieeexplore.ieee.org/stamp/stamp.jsp?tp=&arnumber=9498954 (Year: 2021).*

Baucas, Marc Jayson et al. IoT-Based Smart Home Device Monitor Using Private Blockchain Technology and Localization. IEEE Networking Letters, vol. 3, Issue: 2. https://ieeexplore.ieee.org/stamp/stamp.jsp?tp=&arnumber=9392008 (Year: 2021).*

Mansoor, Ahsan et al. Scavenger Hunt: Utilization of Blockchain and IoT for a Location-Based Game. IEEE Access, vol. 8. https://ieeexplore.ieee.org/stamp/stamp.jsp?tp=&arnumber=9253568 (Year: 2020).*

* cited by examiner

SMART CONTRACT FILTRATION IN A WIRELESS COMMUNICATION SYSTEM

TECHNICAL BACKGROUND

Wireless communication systems provide wireless data services to wireless user devices. For example, wireless communication systems serve mobile internet-access to phones, vehicles, and other devices. The wireless user devices execute user applications that consume the wireless data services. For example, a phone may execute a social-networking application that communicates with a content server over a wireless communication system. The wireless communication systems have wireless access nodes that exchange wireless signals with the wireless user devices over wireless communication links. The wireless access nodes also exchange this user data with user-plane elements like User Plane Functions (UPFs) and data gateways that are often connected to the internet. The wireless communication systems may also include satellites in earth orbit that wirelessly communicate with the wireless user devices and ground stations. For example, a wireless user device may access the internet over a satellite and a ground station.

The wireless communication systems include distributed ledgers and smart contracts. The distributed ledgers comprise processing circuitry in the user devices, access nodes, satellites, and ground stations that execute smart contact software. The smart contract software processes smart contract inputs to generate and store smart contract outputs in an immutable blockchain format. To generate a smart contract output, the smart contracts execute the same smart contract input based on predetermined terms and conditions to generate a proposed smart contract output. The smart contracts in the distributed ledger then compare their proposed smart contract output to build a consensus on the correct output. When a consensus is reached, the smart contracts store their smart contract output in a blockchain format. The blockchain format comprises data blocks that are stored in the distributed ledger nodes. A data block stores the smart contract output and a hash of the previous data block. Thus, the data blocks are linked by the hashes that represent all previous smart contract outputs.

In some examples, the smart contact outputs are directed as input to other smart contracts. Thus, multiple smart contacts may be sequentially linked in this manner with the output of the "source" smart contracts forming the input to the "target" smart contracts. Unfortunately, this type of smart contract linkage is typically implemented manually and becomes cumbersome. Moreover, a large set of linked smart contracts generates a massive amount of data that may not be warranted.

TECHNICAL OVERVIEW

In some examples, wireless communication devices filter smart contract data. The wireless communication devices generate source smart contract outputs. The wireless communication devices select some of the source smart contract outputs. The wireless communication devices select at least one target smart contract. The wireless communication devices transfer the selected source contract outputs to the selected target smart contract(s). The selections that comprise this filtering may be based on device location, device identifier, digital certificates, device application identifiers, device component identifiers, alarms, messages, time, day, date, and/or some other factors.

In some examples, wireless communication devices filter smart contract data. The wireless communication devices execute source smart contracts and responsively generate source smart contract outputs. The wireless communication devices determine values for the source smart contract outputs and responsively select some of the source smart contract outputs based on the values. The wireless communication devices select target smart contracts for the selected source smart contract outputs. The wireless communication devices transfer the selected source smart contract outputs for input into the selected target smart contracts. The selections that comprise this filtering may be based on device location, device identifier, digital certificates, device application identifiers, device component identifiers, alarms, messages, time, day, date, and/or some other factors.

In some examples, a wireless distributed ledger system filters smart contract data. In the wireless distributed ledger system, wireless communication devices execute source smart contracts and responsively generate source smart contract outputs. The wireless communication devices determine values for the source smart contract outputs and responsively select some of the source smart contract outputs based on the values. The wireless communication devices select target smart contracts for the selected source smart contract outputs. The wireless communication devices transfer the selected source smart contract outputs for input into the selected target smart contracts. The selections that comprise this filtering may be based on device location, device identifier, digital certificates, device application identifiers, device component identifiers, alarms, messages, time, day, date, and/or some other factors.

DETAILED DESCRIPTION

Figure 1:
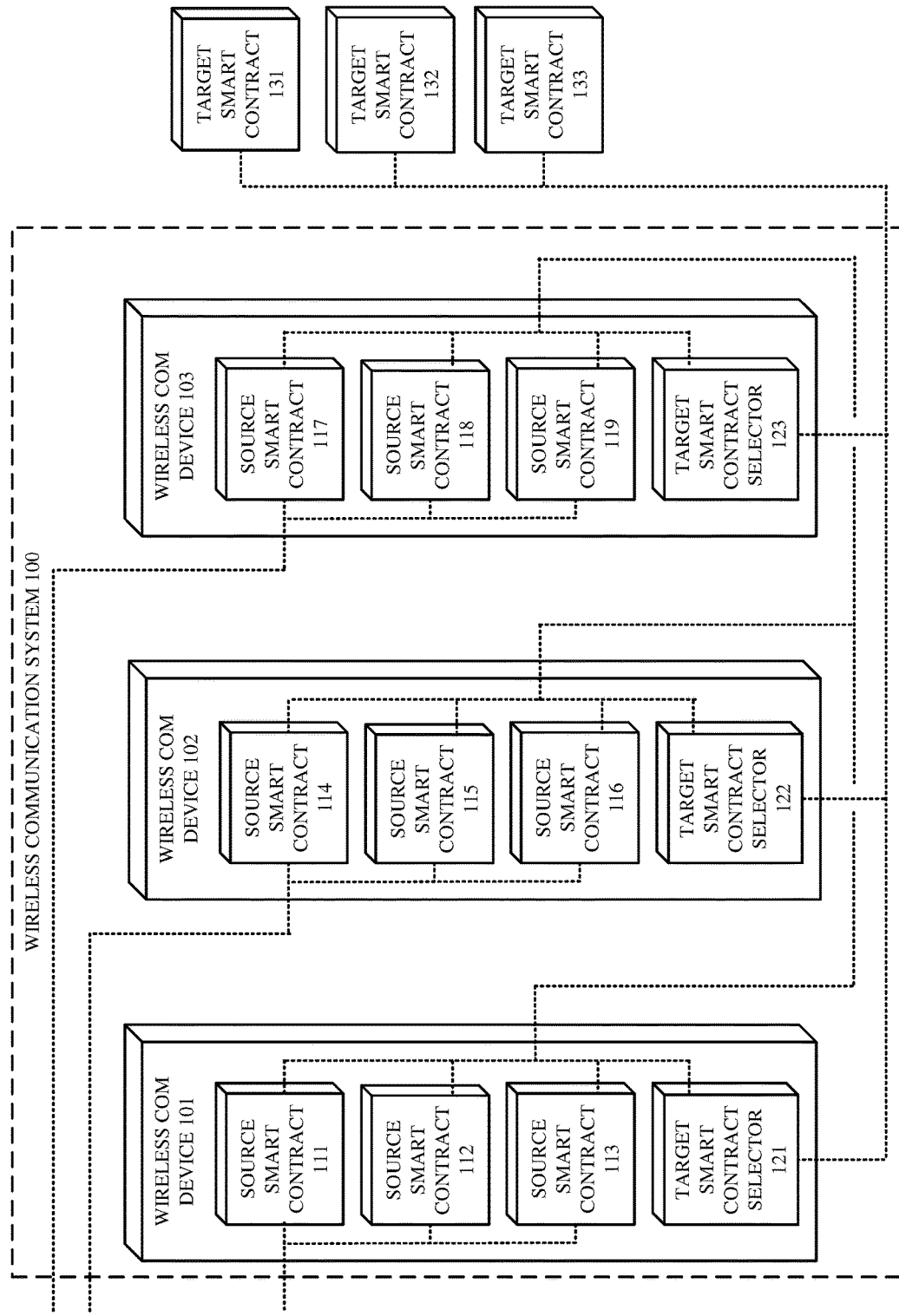
FIG. 1 illustrates an exemplary wireless communication system that filters smart contract data in wireless communication devices.

FIG. 1 illustrates exemplary wireless communication system 100 to filter smart contract data in wireless communication devices 101-103. Wireless communication system 100 comprises wireless communication devices 101-103. Wireless communication devices 101-103 comprise phones, computers, access nodes, satellites, ground stations, or some other apparatus with wireless communication circuitry. Wireless communication device 101 comprises source smart contracts 111-113 and target smart contract selector 121. Wireless communication device 102 comprises source smart contracts 114-116 and target smart contract selector 122. Wireless communication device 103 comprises source smart contracts 117-119 and target smart contract selector 123. For clarity, the amount of wireless communication devices and smart contracts that are shown on FIG. 1 has been restricted.

Various examples of system operation and configuration are described herein. In some examples, wireless communication devices 101-103 generate and/or wirelessly receive source smart contract inputs. In wireless communication devices 101-103, source smart contracts 111-119 process the source smart contract inputs to generate source smart contract outputs. Source smart contracts 111-119 transfer their source smart contract outputs to target smart contract selectors 121-123 in their own wireless communication devices 101-103. For example, in wireless communication device 102, source smart contract 115 transfers its smart contract outputs to target smart contract selector 122.

Target smart contract selectors 121-123 filter the smart contract outputs by selecting only some of these outputs to forward to target smart contracts 131-133. Target smart contract selectors 121-123 further filter the selected smart contract outputs by selecting only some of target smart contracts 131-133 to receive the forwarded outputs. The selections that comprise this filtering may be based on device location, device identifier, digital certificates, device application identifiers, device component identifiers, alarms, messages, time, day, date, and/or some other factors. Target smart contract selectors 121-123 transfer the selected source smart contract outputs to their selected target smart contracts 131-133. Target smart contracts 131-133 process these smart contract outputs as inputs to their own smart contracts which generate their own smart contract outputs. Groups of source smart contracts 111-119 may comprise distributed ledgers. Wireless communication devices 101-103 may comprise wireless User Equipment (UEs), wireless access nodes in Radio Access Networks (RANs), satellites in earth orbit, satellite ground stations, and/or some other communication apparatus with wireless communication circuitry.

Wireless communication devices 101-103 comprise radios that wirelessly communicate using wireless protocols like Institute of Electrical and Electronics Engineers 802.11 (WIFI), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and Sixth Generation (6G) satellite communications. Wireless communication devices 101-103 comprise microprocessors, software, memories, transceivers, bus circuitry, and/or some other data processing components, The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, smart contracts, applications, and functions. The microprocessors retrieve the software from the memories and execute the software to drive the operation of wireless communication system 100 as described herein.

Figure 2:
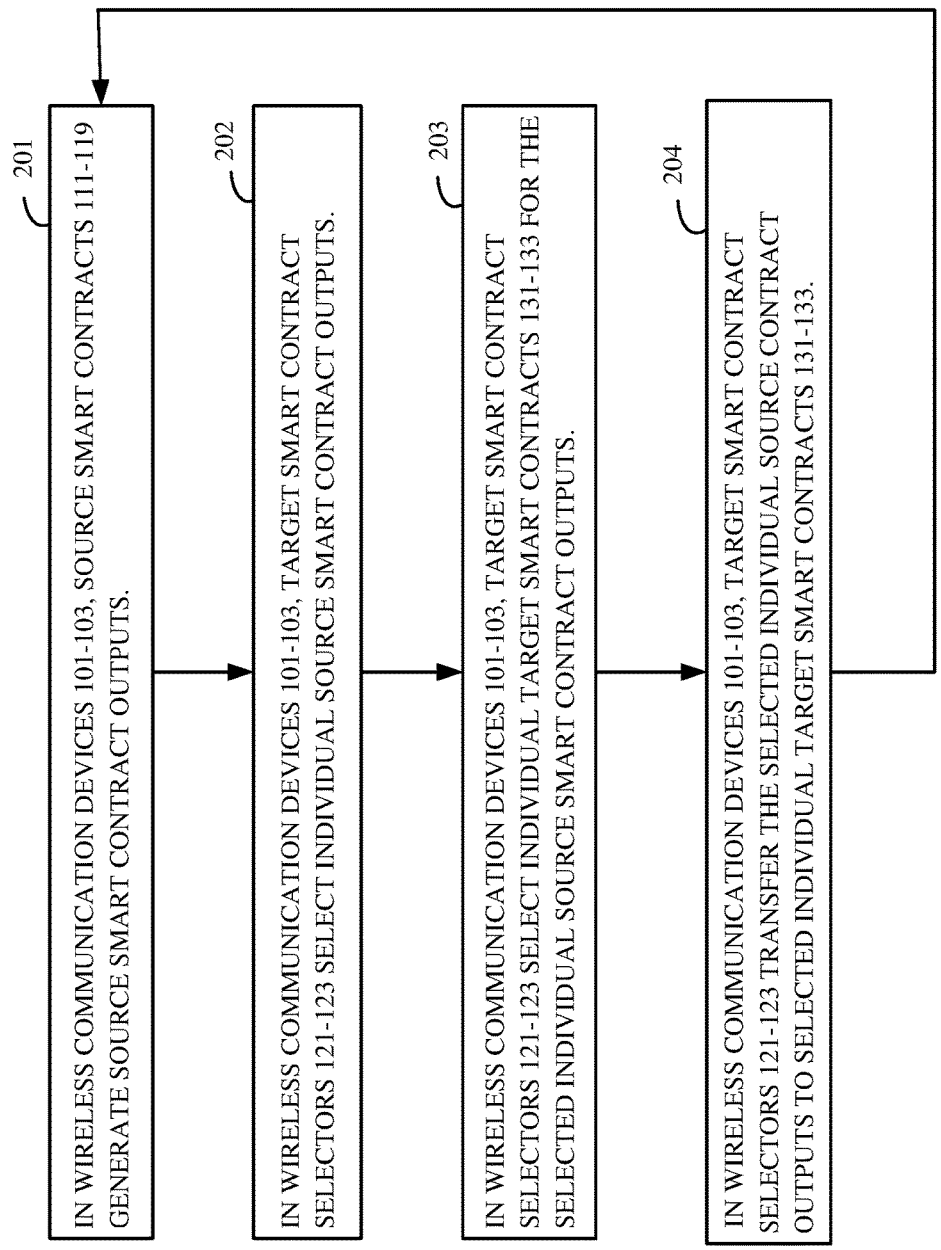
FIG. 2 illustrates an exemplary operation of the wireless communication system to filter smart contract data in the wireless communication devices.

FIG. 2 illustrates an exemplary operation of wireless communication system 100 to filter smart contract data in wireless communication devices 101-103. The operation may differ in other examples. In wireless communication devices 101-103, source smart contracts 111-119 generate source smart contract outputs (201). In wireless communication devices 101-103, target smart contract selectors 121-123 select some of the source smart contract outputs (202). In wireless communication devices 101-103, target smart contract selectors 121-123 select individual target smart contracts 131-133 for the selected source smart contract outputs (203). In wireless communication devices 101-103, target smart contract selectors 121-123 transfer their selected target smart contract outputs to individual target smart contracts 131-133 (204). The selection of the smart contract outputs and the smart contract targets may be based on device location, device identifier, digital certificates, device application identifiers, device component identifiers, alarms, messages, time, day, date, and/or some other factors.

Figure 3:
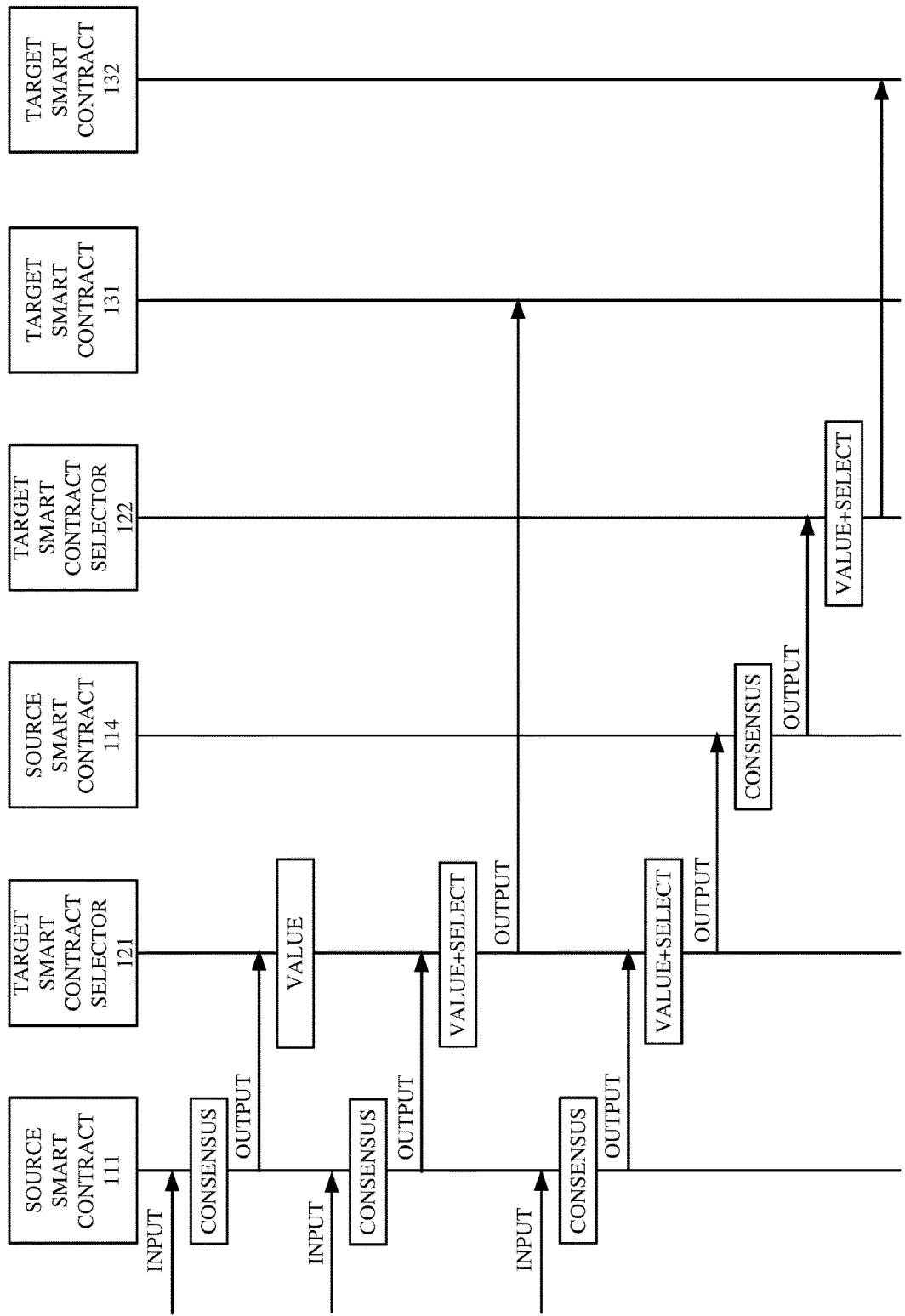
FIG. 3 illustrates an exemplary operation of the wireless communication system to filter smart contract data in the wireless communication devices.

FIG. 3 illustrates an exemplary operation of wireless communication system 100 to filter smart contract data in wireless communication devices 101-103. The operation may differ in other examples. Source smart contract 111 in wireless communication device 101 receives a source smart contract input. Source smart contract 111 reaches a consensus with other smart contracts on a source smart contract output. Source smart contract 111 transfers the source smart contract output to target smart contract selector 121 in wireless communication device 101. Target smart contract selector 121 generates a value for the source smart contract output based on device location, device identifier, digital certificates, device application identifiers, device component identifiers, alarms, messages, time, day, date, and/or some other factors. In this example, the value is low, and as a result, target smart contract selector 121 does not select any target smart contracts 131-133 to receive the source smart contract output.

Source smart contract 111 then receives another source smart contract input. Source smart contract 111 reaches a consensus with other smart contracts on another source smart contract output. Source smart contract 111 transfers the other source smart contract output to target smart contract selector 121. Target smart contract selector 121 generates another value for the other source smart contract output. In this example, the value is high, and as a result, target smart contract selector 121 selects target smart contract 131 to receive the source smart contract output. The selection of target smart contract 131 may be based on device location, device identifier, digital certificates, device application identifiers, device component identifiers, alarms, messages, time, day, date, and/or some other factors. Target smart contract selector 121 transfers the selected source smart contract output to target smart contract 131.

Source smart contract 111 then receives another source smart contract input. Source smart contract 111 reaches a consensus with other smart contracts on a source smart contract output. Source smart contract 111 transfers the source smart contract output to target smart contract selector 121. Target smart contract selector 121 generates a value for the source smart contract output. In this example, the value is high, and as a result, target smart contract selector 121 selects source smart contract 114 in wireless communication device 102 to receive the source smart contract output. Target smart contract selector 121 transfers the selected source smart contract output to source smart contract 114.

Source smart contract 114 receives the source smart contract input and reaches a consensus with other smart contracts on a source smart contract output. Source smart contract 114 transfers the source smart contract output to target smart contract selector 122. Target smart contract selector 122 generates a value for the source smart contract output. In this example, the value is high, and as a result, target smart contract selector 122 selects target smart contract 132 to receive the source smart contract output. Target smart contract selector 122 transfers the selected source smart contract output to target smart contract 132.

Advantageously, wireless communication system 100 intelligently links smart contracts together. Moreover, wireless communication system 100 filters the amount of transferred smart contract outputs and targets, so the amount of transferred smart contract data is warranted by the value of the smart contract outputs.

Figure 4:
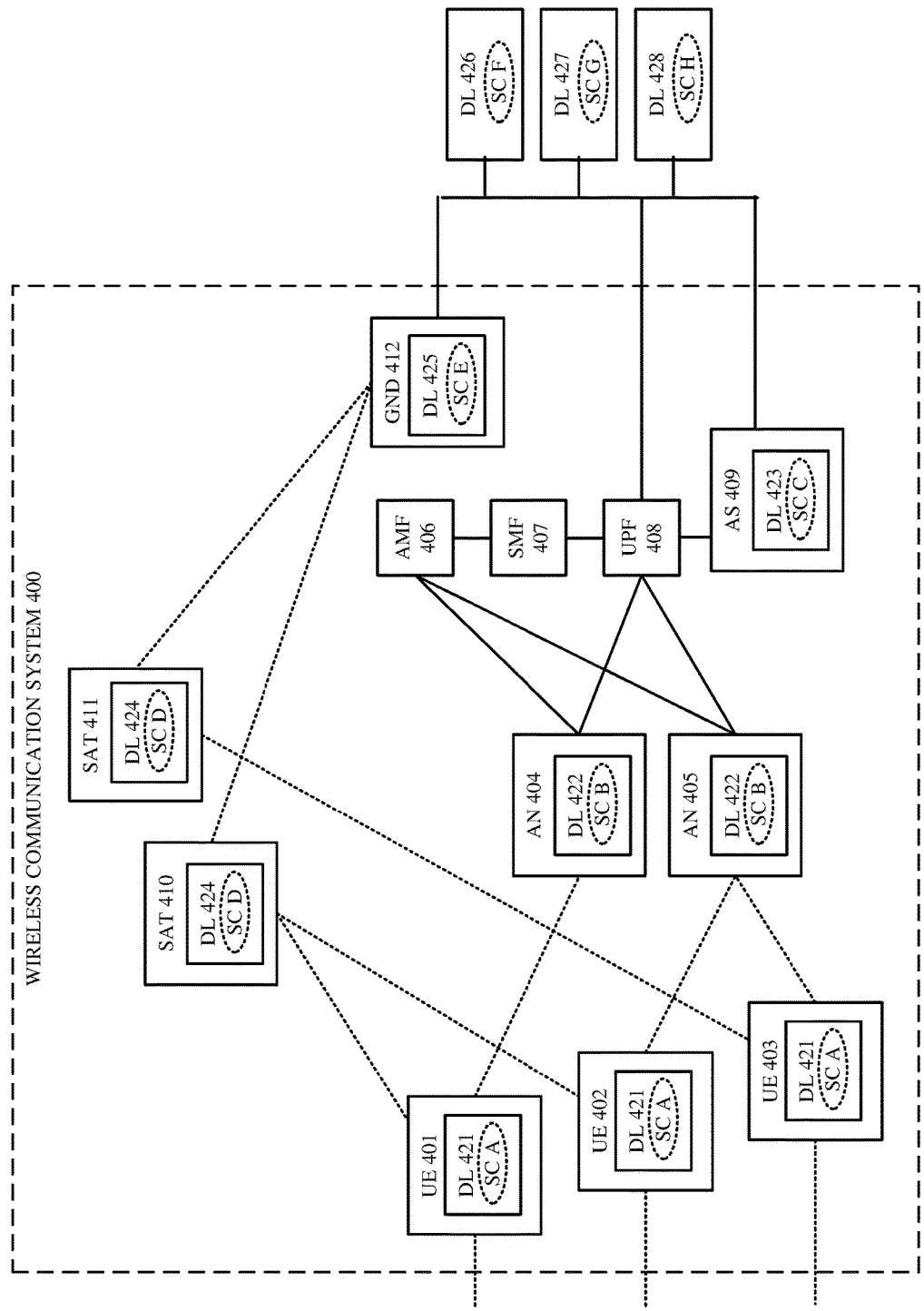
FIG. 4 illustrates an exemplary wireless communication system to filter smart contract data in user equipment, wireless access nodes, application servers, satellites, and ground stations.

FIG. 4 illustrates an exemplary wireless communication system 400 to filter smart contract data in wireless User Equipment (UEs) 401-403, Fifth Generation New Radio (5GNR) Access Nodes (ANs) 404-405, Application Server (AS) 409, Sixth Generation (6G) satellites (SAT) 410-411, and ground station (GND) 412. Wireless communication system 400 comprises an example of wireless communication system 100, although wireless communication system 100 may differ. For example, AS 409 could be another type of data center. Wireless communication system 400 comprises UEs 401-403, ANs 404-405, Access and Mobility Management Function (AMF) 406, Session Management Function (SMF) 407, User Plane Function (UPF) 408 AS 409, satellites 410-411, and ground station 412. UEs 401-403 comprise Distributed Ledger (DL) 421 that executes Smart Contract (SC) A. ANs 404-405 comprise DL 422 that executes SC B. ANs 404-405 comprise DL 422 that executes SC B. AS 409 comprise DL 423 that executes SC C. Satellites 410-411 comprise DL 424 that executes SC D. Ground station 412 comprises DL 425 that executes SC E. External to wireless communication system DLs 426-428 execute respective SCs F, G, and H. For clarity, the number of UEs, ANs, ASs, satellites, ground stations, DLs, and SCs has been restricted on FIG. 4.

UEs 401-403 receive or generate inputs for SC A in DL 421. In DL 421, SC A processes the SC A inputs to build consensus and generate SC A outputs. UEs 401-403 determine values for the SC A outputs. The selected the SC A outputs that have values which exceed a threshold are forwarded—where the threshold is set to achieve the desired filtering. For example, a medical system may use thresholds to forward abnormal medical outputs like high blood pressure or body temperature while not transferring the normal medical outputs for high blood pressure or body temperature. UEs 401-403 select one or more target SCs for their selected SC A outputs. UEs 401-403 forward their selected SC A outputs to the selected target SCs. For example, UE 401 may forward a selected SC A output to SC D in satellite 410. SC A may designate one of UEs 401-403 to perform this SC A output selection and forwarding.

ANs 404-405 receive or generate inputs for SC B in DL 422. In DL 422, SC B processes the SC B inputs to build consensus and generate SC B outputs. ANs 404-405 determine values for the SC B outputs. The selected the SC B outputs that have values which exceed a threshold are forwarded. ANs 404-405 select one or more target SCs for their selected SC B outputs. ANs 404-405 forward their selected SC B outputs to the target SCs. For example, AN 404 may forward a selected SC B output to SC A in UE 402. SC B may designate one of ANs 404-405 to perform this SC B output selection and forwarding.

AS 409 receives or generates inputs for SC C in DL 423. In DL 423, SC C processes the SC C inputs to build consensus and generate SC C outputs. AS 409 determines values for the SC C outputs. The selected the SC C outputs that have values which exceed a threshold are forwarded. AS 409 selects one or more target SCs for its selected SC C outputs. AS 409 forwards its selected SC C outputs to the target SCs. For example, AS 409 may forward a selected SC C output to SC G in DL 427.

Satellites 410-411 receive or generate inputs for SC D in DL 424. In DL 424, SC D processes the SC D inputs to build consensus and generate SC D outputs. Satellites 410-411 determine values for the SC D outputs. The selected SC D outputs that have values which exceed a threshold are forwarded. Satellites 410-411 select one or more target SCs for their selected SC D outputs. Satellites 410-411 forward their selected SC D outputs to the target SCs. For example, satellite 410 may forward a selected SC D output to SC F in DL 426. SC D may designate one of satellites 410-411 to perform this SC D output selection and forwarding.

Ground station 412 receives or generates inputs for SC E in DL 425. In DL 425, SC E processes the SC E inputs to build consensus and generate SC E outputs. Ground station 412 determines values for the SC E outputs. The selected the SC E outputs that have values which exceed a threshold are forwarded. Ground station 412 selects one or more target SCs for its selected SC E outputs. Ground station 412 forwards its selected SC D outputs to the target SCs. For example, Ground station 412 may forward a selected SC E output to SC H in DL 428.

The selection and forwarding may occur from any of SCs A-H to any other SCs A-H. The selection and forwarding may be based on device location, device identifier, digital certificates, device application identifiers, device component identifiers, alarms, messages, time, day, date, and/or some other factors. For example, UE 401 may forward SC A outputs to SC H when these outputs are generated from SC A inputs at a specific location. In another example, AN 404 may forward SC B outputs to SC C when the SC B outputs are generated from SC B inputs that have a particular digital certificate. Various different rules for selection and forwarding could be used by wireless communication system 400.

Figure 5:
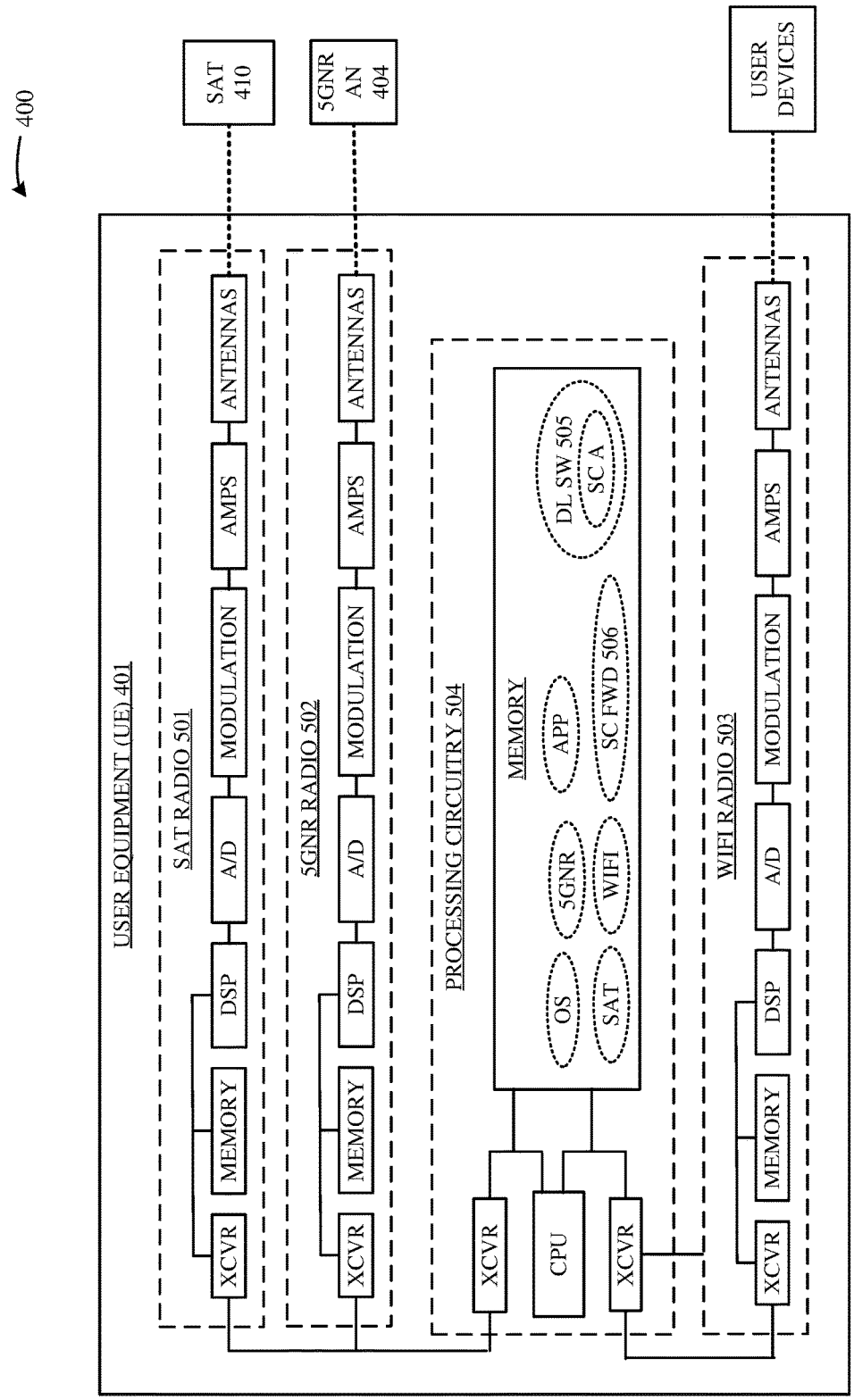
FIG. 5 illustrates an exemplary wireless user equipment to filter smart contract data in the wireless communication system.

FIG. 5 illustrates exemplary UE 401 to filter smart contract data in wireless communication system 400. UE 401 represents an example of wireless communication devices 101-103 and UEs 401-402, although devices 101-103 and UEs 402-403 may differ. UE 401 comprises Satellite (SAT) radio 501, Fifth Generation New Radio (5GNR) radio 502, Wireless Fidelity (WIFI) radio 503, and processing circuitry 504. Radios 501-503 comprise antennas, amplifiers, filters, modulation, analog-to-digital interfaces, DSPs, memories, and transceivers (XCVRs) that are coupled over bus circuitry. Processing circuitry 504 comprises CPU, memory, and transceivers that are coupled over bus circuitry. The memory in processing circuitry 504 stores software like an Operating System (OS), 5GNR application (5GNR), satellite application (SAT), WIFI application (WIFI), user applications (APP), distributed ledger software (DL SW) 505, and Smart Contract Forwarder (SC FWD) 506. DL software 505 implements DL 421 and comprises Smart Contract (SC) A. SC FWD 506 comprises an example of target smart contract selectors 121-123, although selectors 121-123 may differ.

The antennas in satellite radio 501 exchange satellite signals with satellite (SAT) 410. The antennas in 5GNR radio 502 exchange 5GNR signals with 5GNR AN 404. The antennas in WIFI radio 503 exchange WIFI signals with user devices. Transceivers in radios 501-503 are coupled to transceivers in processing circuitry 504. In processing circuitry 504, the CPU retrieves the software from the memory and executes the software to direct the operation of UE 401 as described herein.

UE 401 receives SC A inputs from the user devices over WIFI radio 503. UE 401 executes the user applications to generate SC A inputs. SC A processes the SC A inputs to build consensus with UEs 402-403 (and typically other devices in DL 421) and generates SC A outputs. In UE 401, SC FWD 506 determines values for the SC A outputs, and when the selected the SC A outputs have values which exceed a threshold, SC FWD 506 selects target SCs and forwards the selected SC A outputs to the selected target SCs. For example, SC FWD 506 may forward a selected SC A output to SC B in 5GNR AN 404 when the selected SC A output is based on an SC A input that is accompanied by a particular digital certificate. In another example, SC FWD 506 may forward a selected SC A output to SC D in satellite 410 when the selected SC A output is based on an SC A input from a specific user device at a designated location.

Figure 6:
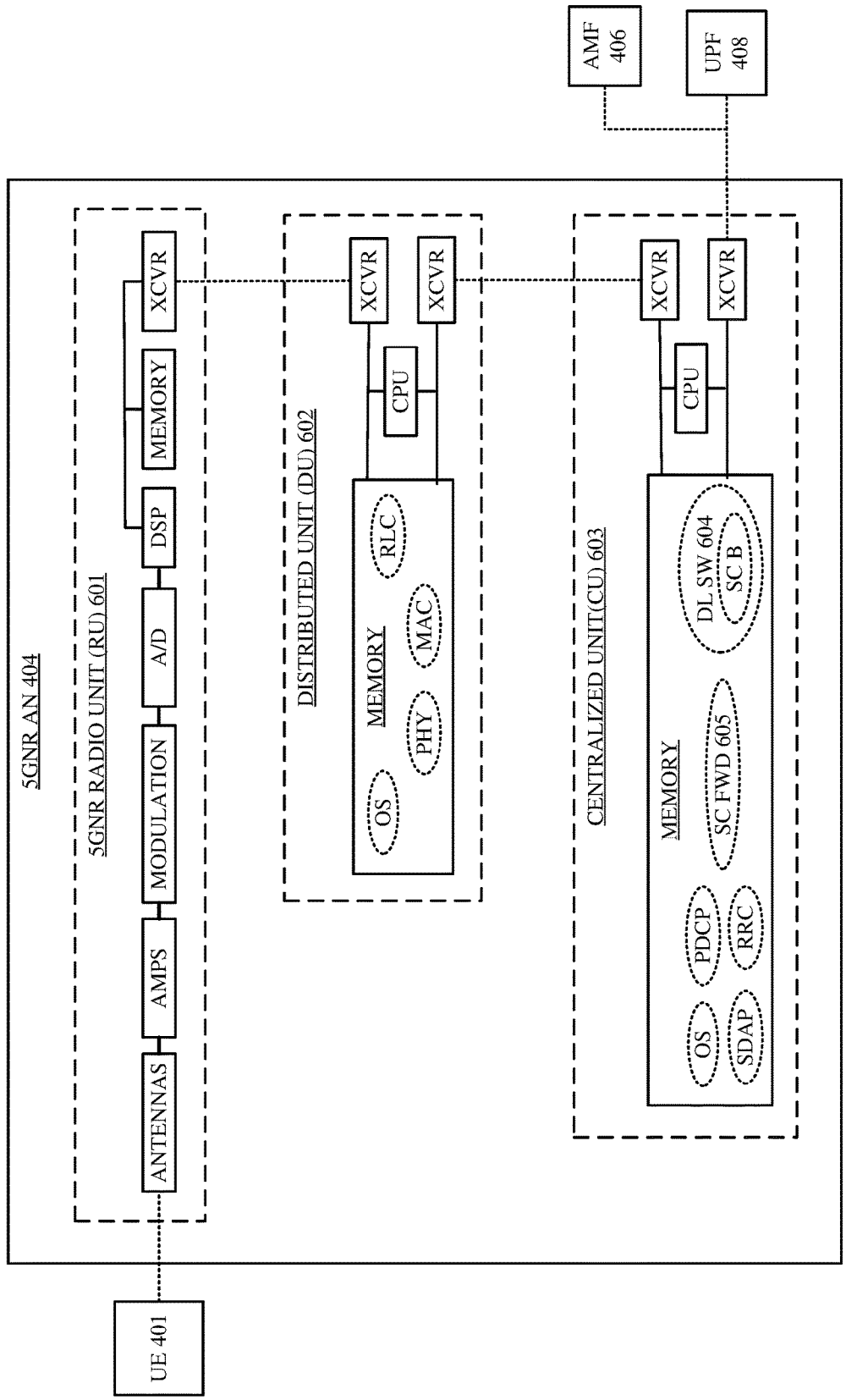
FIG. 6 illustrates an exemplary wireless access node to filter the smart contract data in the wireless communication system.

FIG. 6 illustrates exemplary 5GNR Access Node (AN) 404 to filter smart contract data in wireless communication system 400. 5GNR AN 404 comprises an example of wireless communication devices 101-103 and AN 405, although devices 101-103 and AN 405 may differ. 5GNR AN 404 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for Physical Layer (PHY), Media Access Control (MAC), and Radio Link Control (RLC). CU 603 comprises memory, CPU, and transceivers that are coupled over bus circuitry. The memory in CU 603 stores an operating system and 5GNR network applications for Packet Data Convergence Protocol (PDCP), Service Data Adaption Protocol (SDAP), and Radio Resource Control (RRC). The memory in CU 603 also stores distributed ledger (DL) software 604, and Smart Contract Forwarder (SC FWD) 605. DL software 604 implements DL 422 and comprises Smart Contract (SC) B. SC FWD 605 comprises an example of target smart contract selectors 121-123, although selectors 121-123 may differ.

The antennas in 5GNR RU 601 are wirelessly coupled to UE 401 over 5GNR links. Transceivers in 5GNR RU 601 are coupled to transceivers in DU 602. Transceivers in DU 602 are coupled to transceivers in CU 603. Transceivers in CU 603 are coupled AMF 406 and UPF 408. The DSP and CPU in RU 601, DU 602, and CU 603 execute the radio applications, operating systems, network applications, DL software 604, and SC FWD 605 to exchange data and signaling with UE 401, AMF 406, and UPF 408 as described herein.

AN 404 receives or generate inputs for SC B in DL software 604. SC B processes the SC B inputs to build consensus and generate SC B outputs. SC FWD 605 determines values for the SC B outputs. The SC B outputs that have values which exceed a threshold are forwarded. SC FWD 605 selects one or more target SCs for their selected SC B outputs and forwards their selected SC B outputs to the target SCs. For example, SC FWD 605 may forward a selected SC B output to SC C in AS 409 when the selected SC B output is based on an input from UE 401 that is accompanied by a particular digital certificate. In another example, SC FWD 605 may forward a selected SC B output to SC G in DL 427 when the selected SC B output is generated by the RRC in CU 603.

Figure 7:
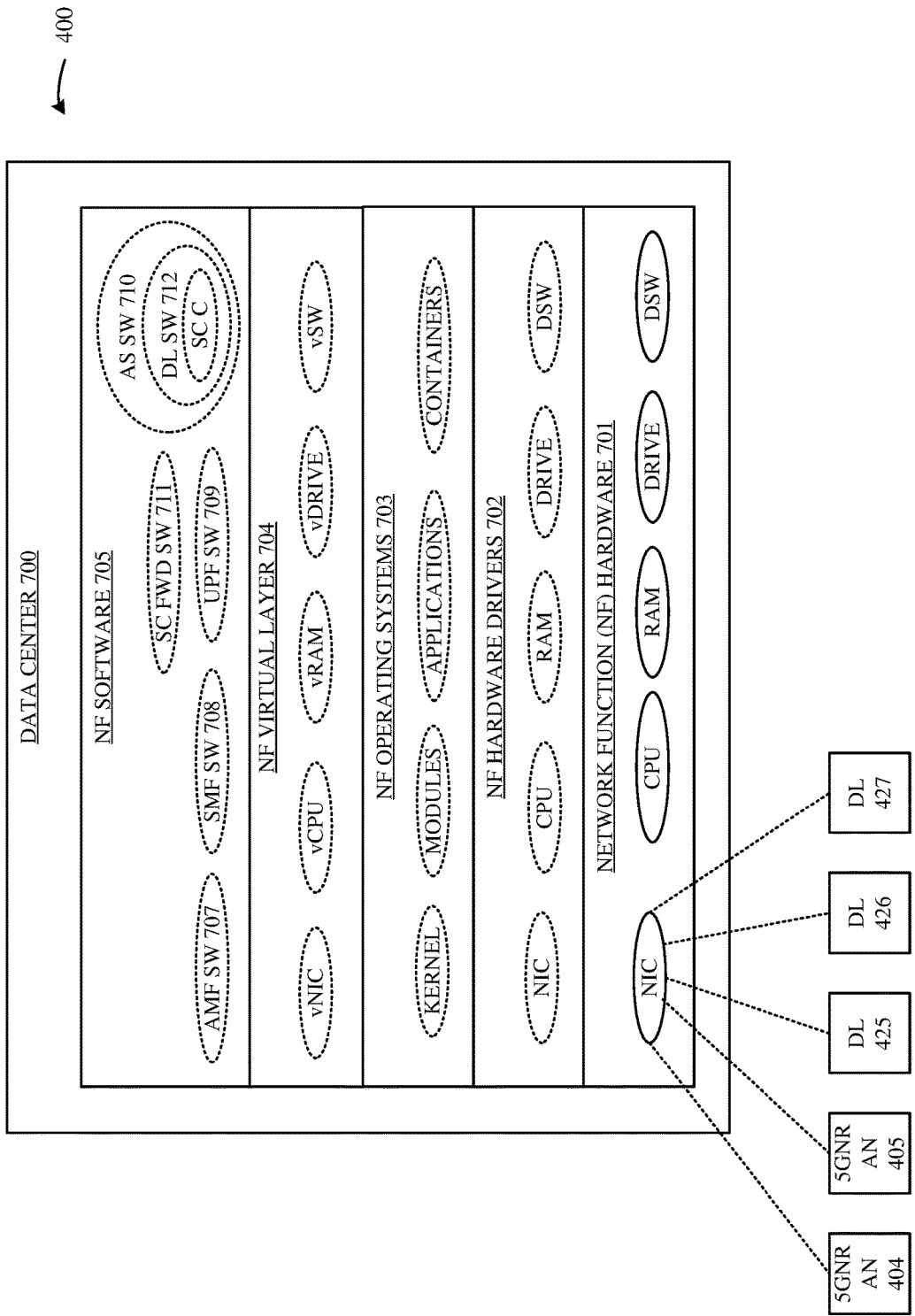
FIG. 7 illustrates an exemplary application server to filter the smart contract data in the wireless communication system.

FIG. 7 illustrates exemplary data center 700 to filter smart contract data in wireless communication system 400. Network data center 700 comprises NF hardware 701, NF hardware drivers 702, NF operating systems 703, NF virtual layer 704, and NF Software (SW) 705. NF hardware 701 comprises Network Interface Cards (NICs), CPU, RAM, Flash/Disk Drives (DRIVE), and Data Switches (DSW). NF hardware drivers 702 comprise software that is resident in the NIC, CPU, RAM, DRIVE, and DSW. NF operating systems 703 comprise kernels, modules, applications, and containers. NF virtual layer 704 comprises vNIC, vCPU, vRAM, vDRIVE, and vSW. NF SW 705 comprises AMF SW 707, SMF SW 708, UPF SW 709, AS SW 710, and SC FWD SW 711. Data center 700 executes AS SW 710 to form AS 409. AS SW 711 comprises DL SW 712 that forms DL 423 which executes SC C. SC FWD 711 comprises an example of target smart contract selectors 121-123, although selectors 121-123 may differ.

The NIC in NF hardware 701 are coupled to 5GNR ANs 404-405 and DLs 425-427. NF hardware 701 executes NF hardware drivers 702, NF operating systems 703, NF virtual layer 704, and NF SW 705 to form and operate AMF 406, SMF 407, UPF 408, and AS 409. Network data center 700 may be located at a single site or be distributed across multiple geographic locations.

When executed by data center 700 to form AS 409, AS SW 710 receives or generates inputs for SC C in DL 423. SC C processes the SC C inputs to build consensus and generate SC C outputs. SC FWD 711 determines values for the SC C outputs. When the SC C outputs have values which exceed a threshold, SC FWD 711 selects target SCs and forwards the selected SC C outputs to the selected target SCs. For example, SC FWD 711 may forward a selected SC C output to SC G in DL 427 when the SC C output is based on an SC C input that was formerly a selected SC B output.

Figure 8:
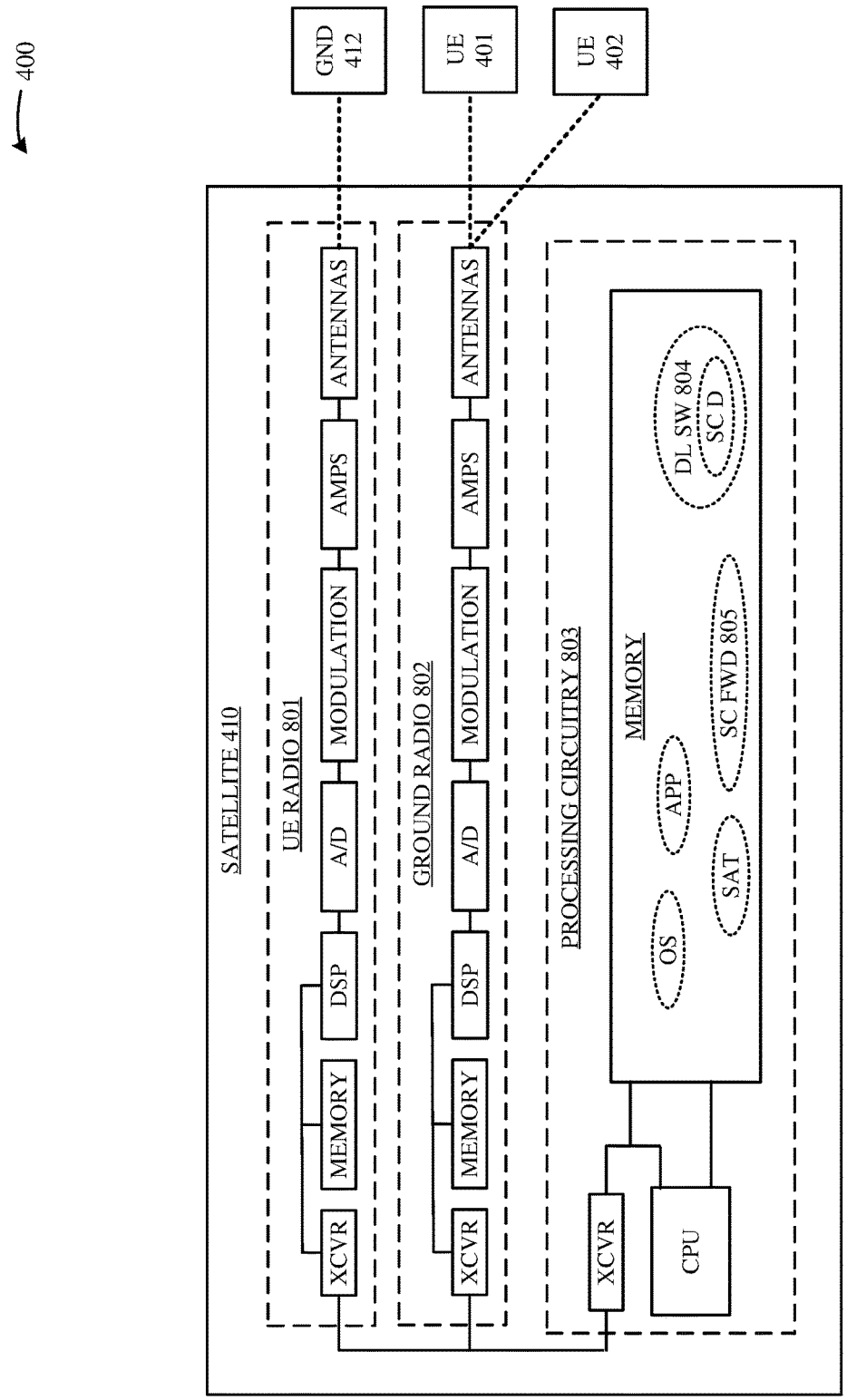
FIG. 8 illustrates an exemplary satellite to filter the smart contract data in the wireless communication system.

FIG. 8 illustrates exemplary satellite 410 to filter smart contract data in wireless communication system 400. Satellite 410 comprises an example of wireless communication devices 101-103 and satellite 411, although devices 101-103 and satellite 411 may differ. Satellite 410 comprises UE radio 801, ground radio 802, and processing circuitry 803. Radios 801-802 comprise antennas, amplifiers, filters, modulation, analog-to-digital interfaces, DSPs, memories, and transceivers (XCVRs) that are coupled over bus circuitry. Processing circuitry 803 comprises CPU, memory, and transceivers that are coupled over bus circuitry. The memory in processing circuitry 803 stores software like an Operating System (OS), satellite application (SAT), distributed ledger software (DL SW) 804, and Smart Contract Forwarder (SC FWD) 805. DL software 804 implements DL 424 and comprises Smart Contract (SC) D. SC FWD 805 comprises an example of target smart contract selectors 121-123, although selectors 121-123 may differ.

The antennas in downlink radio 801 exchanges satellite signals with UEs 401-402. The antennas in ground radio 802 exchange satellite signals with ground station (GND) 412.

Transceivers in radios 801-802 are coupled to transceivers in processing circuitry 803. In processing circuitry 803, the CPU retrieves the software from the memory and executes the software to direct the operation of satellite 410 as described herein.

Satellite 410 receives SC D inputs from the UEs 401-402 over UE radio 802. Satellite 410 executes the satellite applications to generate SC D inputs. SC D processes the SC D inputs to build consensus with other satellites and generates SC D outputs. In satellite 410, SC FWD 805 determines values for the SC D outputs. When the selected the SC D outputs have values which exceed a threshold, SC FWD 805 selects target SCs and forwards the selected SC D outputs to the selected target SCs. For example, SC FWD 805 may forward a selected SC D output to SC E in ground station 412 when the selected SC D output is based on an SC D input that was generated by a satellite application having a particular application identifier. In another example, SC FWD 805 may forward a selected SC D output to SC H when the selected SC D output is based on an SC D input from UE 401 at a specific date and time.

Figure 9:
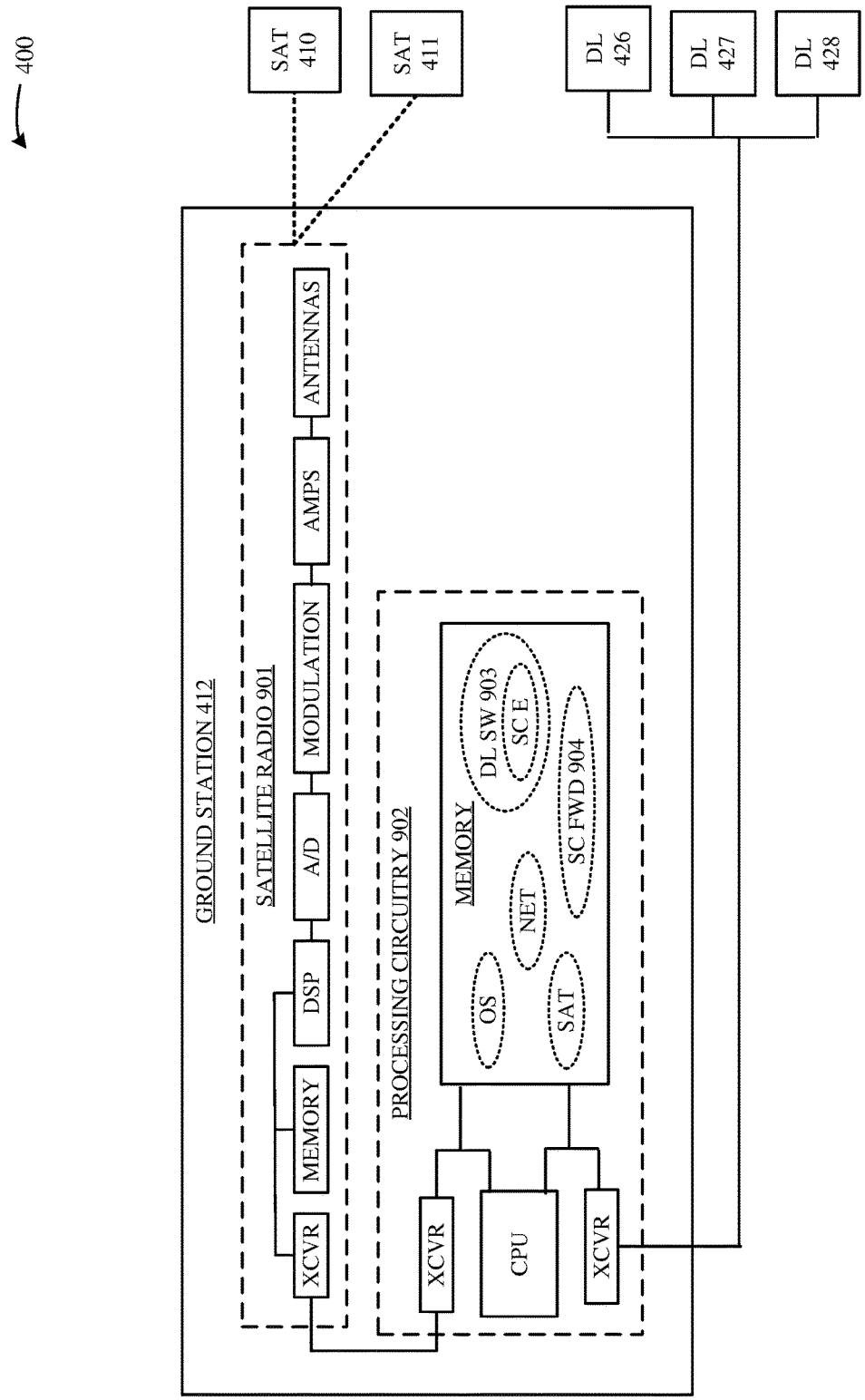
FIG. 9 illustrates an exemplary ground station to filter the smart contract data in the wireless communication system.

FIG. 9 illustrates exemplary ground station 412 to filter smart contract data in wireless communication system 400. Ground station 412 comprises an example of wireless communication devices 101-103, although devices 101-103 may differ. Ground station 412 comprises satellite radio 901 and processing circuitry 902. Satellite radio 901 comprises antennas, amplifiers, filters, modulation, analog-to-digital interfaces, DSP, memory, radio applications, and transceivers that are coupled over bus circuitry. Processing circuitry 902 comprises CPU, memory, and transceivers that are coupled over bus circuitry. The memory in processing circuitry 902 stores software like an Operating System (OS), satellite application (SAT), network application (NET), distributed ledger software (DL SW) 903, and Smart Contract Forwarder (SC FWD) 904. DL software 903 implements DL 425 and comprises Smart Contract (SC) E. SC FWD 904 comprises an example of target smart contract selectors 121-123, although selectors 121-123 may differ.

The antennas in satellite radio 901 exchange satellite signals with satellites 410-411. Transceivers in radio 901 are coupled to transceivers in processing circuitry 902. In processing circuitry 902, the CPU retrieves the software from the memory and executes the software to direct the operation of ground station 412 as described herein.

Ground station 412 receives SC E inputs from satellites 410-411 over satellite radio 901. Ground station 412 executes the satellite applications to generate SC E inputs. SC E processes the SC E inputs to build consensus with other devices and generates SC E outputs. In ground station 412, SC FWD 904 determines values for the SC E outputs. When the selected SC E outputs have values which exceed a threshold, SC FWD 904 selects target SCs and forwards the selected SC E outputs to the selected target SCs. For example, SC FWD 904 may forward a selected SC E output to DL 428 when the selected SC E output is generated by a satellite application in response to a message from DL 428. In another example, SC FWD 904 may forward a selected SC E output to SC G when the selected SC E output is based on an SC E input from satellite 411 at a specific location.

Figure 10:
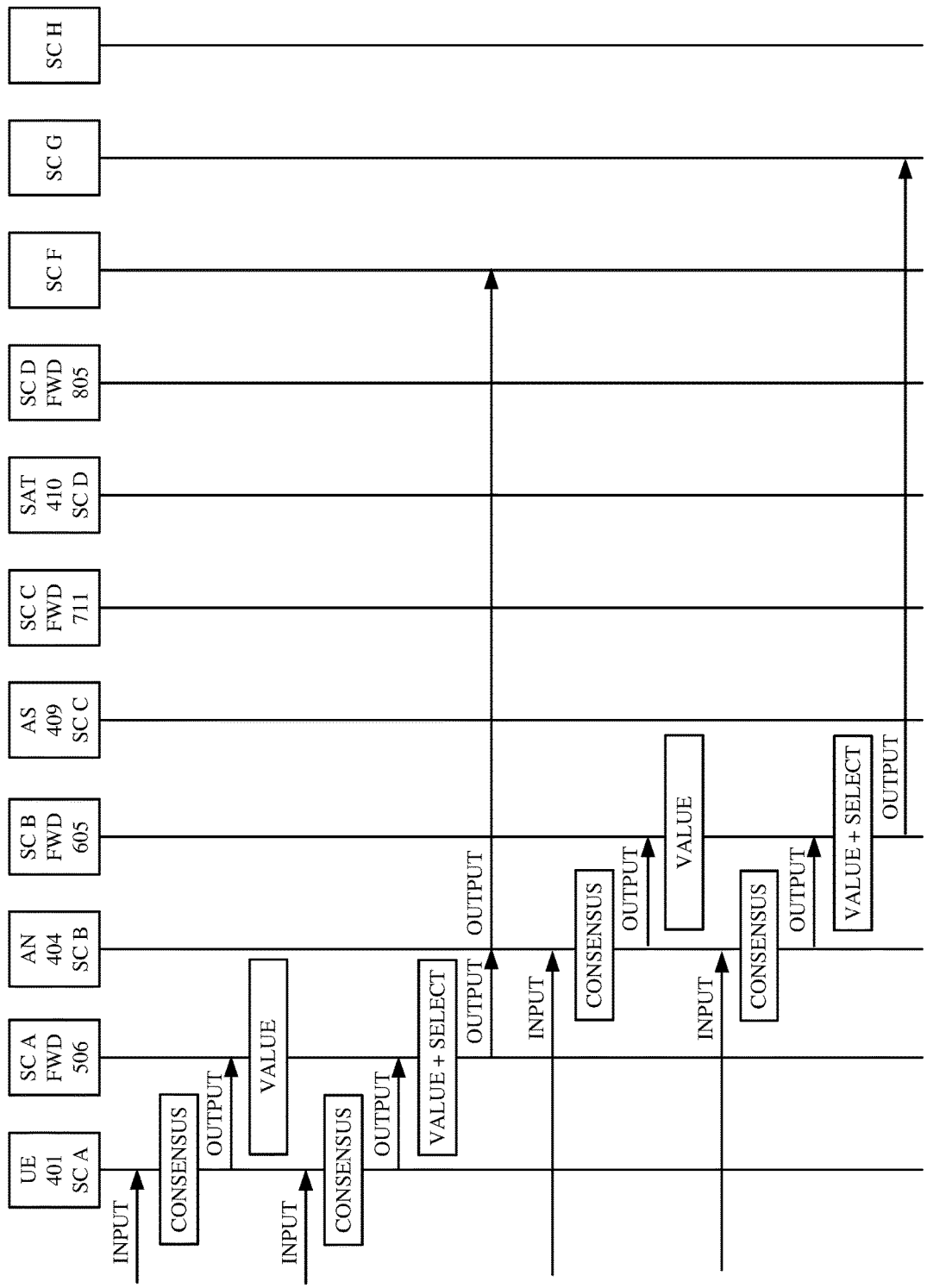
FIG. 10 illustrates an exemplary operation of the wireless communication system to filter smart contract data.

FIG. 10 illustrates an exemplary operation of wireless communication system 400 to filter smart contract data. The operation may differ in other examples. Smart Contract A (SC A) in UE 401 receives an SC A input. SC A reaches a consensus with other SC A nodes in DL 421 for an SC A output. SC A transfers the SC A output to SC A Forwarder (SC A FWD) 506 in UE 401. SC A FWD 506 generates a value for the SC A output. The value may comprise a numerical amount or a yes/no determination that is based on one or more factors. In this example, the SC A input comprises a photograph from a user device in communication with UE 401, and the SC A output comprises an annotated version of the photograph. The annotated photograph is designated as a "no" value by a data structure in SC A FWD 506 based on the current date, time-of-day, and location of UE 401 as applied to a data structure. This SC A output is not forwarded.

SC A in UE 401 receives another SC A input. SC A reaches a consensus with other nodes in DL 421 on an SC A output. SC A transfers the SC A output to SC A FWD 506 in UE 401. SC A FWD 506 generates a value for the other SC A output. In this example, the input comprises a carbon dioxide reading from a user device in communication with UE 401, and the output comprises the carbon dioxide reading along with digital signature for UE 401. The signed carbon dioxide reading is designated as a "yes" value by a data structure in SC A FWD 506 based on the identity of the user device that provided the SC A input. SC A FWD 506 selects target SC F for the SC A output based on the identity of the user device that provided the SC A input. SC A FWD 506 forwards the SC A output to SC F over 5GNR AN 404.

SC B in 5GNR AN 404 receives an SC B input. SC B reaches a consensus on an SC B output with other access nodes in DL 422. SC B transfers the SC B output to SC B FWD 605 in AN 404. SC B FWD 605 generates a value for the smart contract B output. In this example, the SC B input comprises a status message from a UE in communication with AN 404, and the SC B output comprises the status message and verified location of the UE. The SC B output is designated as a "no" value by a data structure in SC B FWD 605 based on the message type and UE identity. The SC B output is not forwarded.

SC B in 5GNR AN 404 receives another SC B input. SC B reaches a consensus with other nodes in DL 422. SC B transfers the SC B output to SC B FWD 605 in AN 404. SC B FWD 605 generates a value for the SC B output. In this example, the input comprises another message from the UE in communication with AN 404, and the output comprises the message along with the verified location of the UE. The SC B output is scored based on message type and UE location which are normalized and summed, and in this example, the numerical score exceeds a threshold in SC B FWD 605. SC B FWD 605 selects target SC G for the message and location by entering the UE location into a data structure. SC B FWD 605 forwards the selected message and location to SC G.

Figure 11:
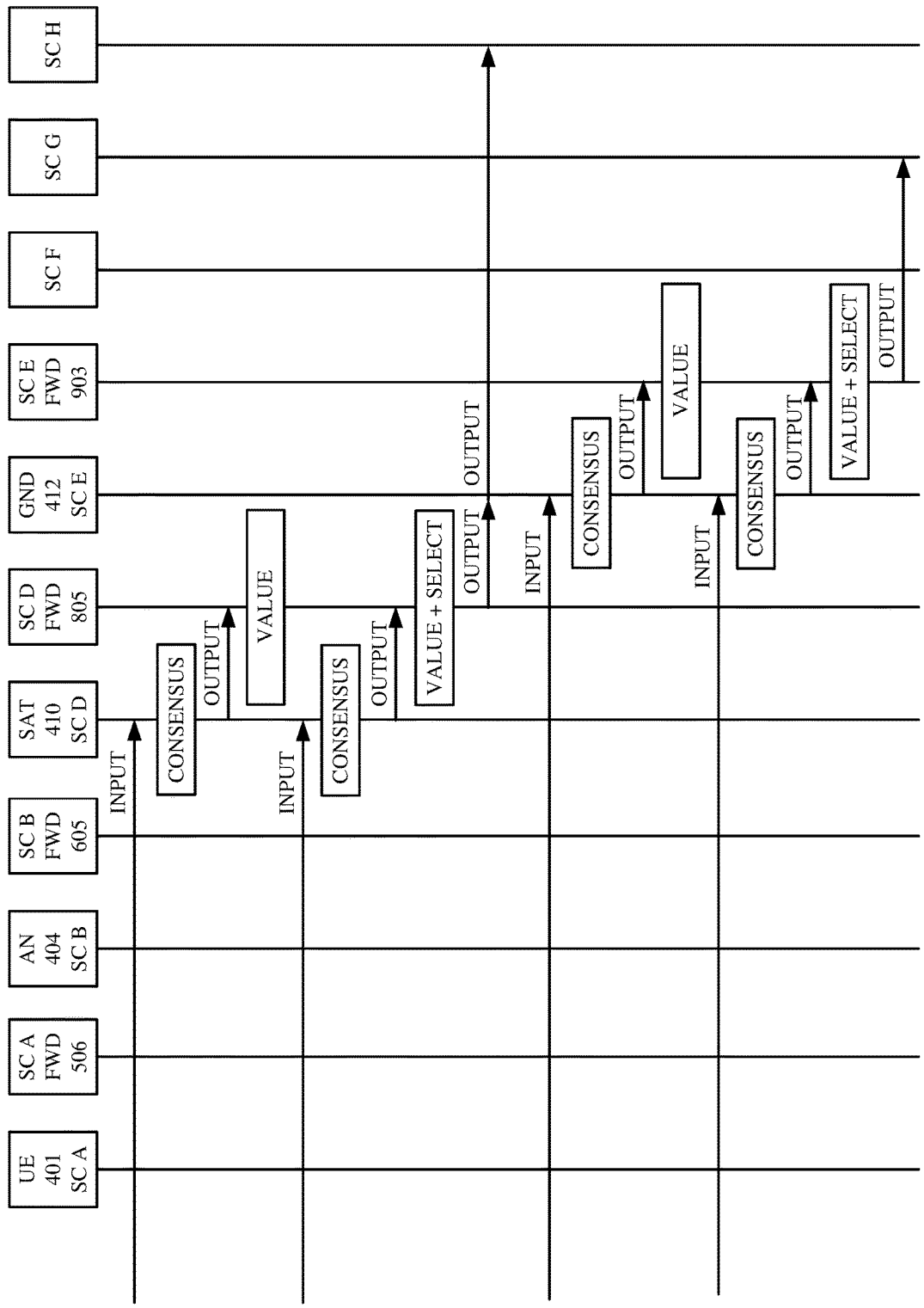
FIG. 11 illustrates an exemplary operation of the wireless communication system to filter the smart contract data.

FIG. 11 illustrates an exemplary operation of wireless communication system 400 to filter smart contract data. The operation may differ in other examples. SC D in satellite 410 receives an SC D input. SC D reaches a consensus on an SC D output with other nodes in DL 424. SC D transfers the SC D output to SC D FWD 805 in satellite 410. SC D FWD 805 generates a value for the smart contract D output. In this example, the value comprises a score where proximity to a known location and time-of-day are normalized, summed, and compared to a threshold. The score falls below the threshold, so this SC D output is not forwarded.

SC D in satellite 410 receives another SC D input. SC D reaches a consensus with other nodes in DL 424 on an SC D output. SC D transfers the SC D output to SC D FWD 805 in satellite 410. SC D FWD 805 generates a value for the SC D output. In this example, the value comprises a score where proximity to the location and time-of-day are normalized, summed, and compared to a threshold. The score exceeds the threshold, so SC FWD 805 selects a target SC H based on a data structure that indicates target SC H for the location used for the proximity determination. SC FWD 805 transfers the SC D output to SC H over ground station (GND) 412.

SC E in ground station 412 receives an SC E input. SC E reaches a consensus on a SC E output with other nodes in DL 425. SC E transfers the SC E output to SC E FWD 904 in ground station 412. SC E FWD 904 generates a value for the SC E output. In this example, the value comprises a yes or no designation based on a list of application identifiers for the application that provided the SC E input. The application identifier for the SC E input is not on the list, so this SC E output is not forwarded.

SC E in ground station 412 receives another SC E input. SC E reaches a consensus with other nodes on DL 425. SC E transfers the SC E output to SC E FWD 904 in ground station 412. SC E FWD 904 generates a value for the SC E output. In this example, the value comprises a yes or no designation based on a list of application identifiers for the application that provided the SC E input. The source application identifier is on the list, so SC E forwards the SC E output to SC G based on the satellite identifier that transferred the SC E input to ground station 412.

Figure 12:
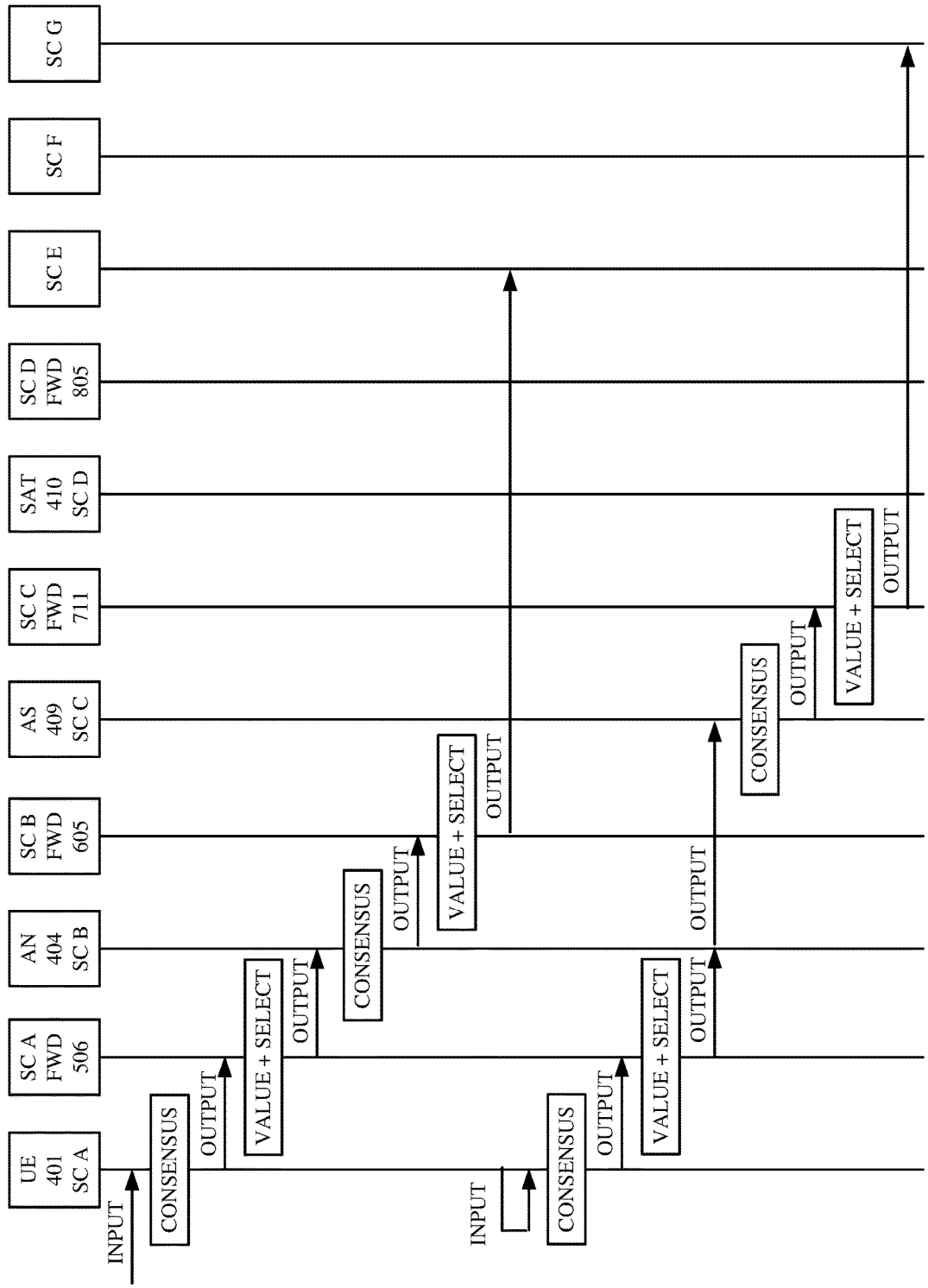
FIG. 12 illustrates an exemplary operation of the wireless communication system to filter the smart contract data.

FIG. 12 illustrates an exemplary operation of wireless communication system 400 to filter smart contract data. The operation may differ in other examples. Smart Contract A (SC A) in UE 401 receives an SC A input. SC A reaches a consensus with other SC A nodes in DL 421 for an SC A output. SC A transfers the SC A output to SC A FWD 506 in UE 401. SC A FWD 506 generates a value for the other SC A output. In this example, the input comprises a voice mail from another UE in communication with UE 401, and the output comprises the voice mail along with a digitally signed location, date, and time for UE 401 when the voice mail was received. The voice mail along with the signed location, date, and time is designated as a "yes" value by a data structure in SC A FWD 506 based on the location, date, and time. SC A FWD 506 selects target SC B in AN 404 for the SC A output based on the location of UE 401. SC A FWD 506 forwards the SC A output to SC B in AN 404.

SC B in AN 404 receives the SC A output as an SC B input. SC B reaches a consensus on an SC B output with other access nodes in DL 422. SC B transfers the SC B output to SC B FWD 605 in AN 404. SC B reaches a consensus with other nodes in DL 422. SC B transfers the SC B output to SC B FWD 605 in AN 404. SC B FWD 605 generates a value for the SC B output. In this example, the input comprises the voice mail along with the signed location, date, and time, and the output comprises the voice mail, signed location, date, and time along with the signed identity and location of the sending UE. The SC B output is scored as a "yes" based on the identities of receiving UE 401 and the sending UE as applied to a data structure in SC B FWD 605. SC B FWD 605 selects target SC E for the SC B output based on the identity of UE 401 as applied to a data structure. SC B FWD 605 forwards the selected voice mail and metadata to SC E.

SC A in UE 401 generates an SC A input. SC A reaches a consensus with other SC A nodes in DL 421 for an SC A output. SC A transfers the SC A output to SC A FWD 506 in UE 401. SC A FWD 506 generates a value for the other SC A output. In this example, the input comprises a medical reading (like heart rate) that was detected by UE 401. The SC A output comprises the medical reading along with the date and time of the medical reading. The medical reading along with the date and time is designated as a "yes" value by a data structure in SC A FWD 506 based on the type of medical reading. SC A FWD 506 selects target SC C in AS 409 for the SC A output based on the location of UE 401. SC A FWD 506 forwards the SC A output to SC C in AS 409.

SC C in AS 409 receives the SC A output as an SC C input. SC C reaches a consensus on an SC C output with other access nodes in DL 423. SC C transfers the SC C output to SC C FWD 711 in AS 409. SC C FWD 711 generates a value for the SC C output. In this example, the input comprises the medical reading, date, and time, and the output comprises a medical alarm along with the medical reading, date, and time. The alarm is based on the medical reading as applied to a medical threshold. The SC C output is scored as a "yes" based on the medical reading exceeding the medical threshold-like heart rate exceeding a heart rate threshold. SC C FWD 711 selects target SC G for the SC C output based on the identity of UE 401 as applied to a data structure. SC C FWD 711 forwards the selected heart rate, date, time, and alarm to SC G.

Figure 13:
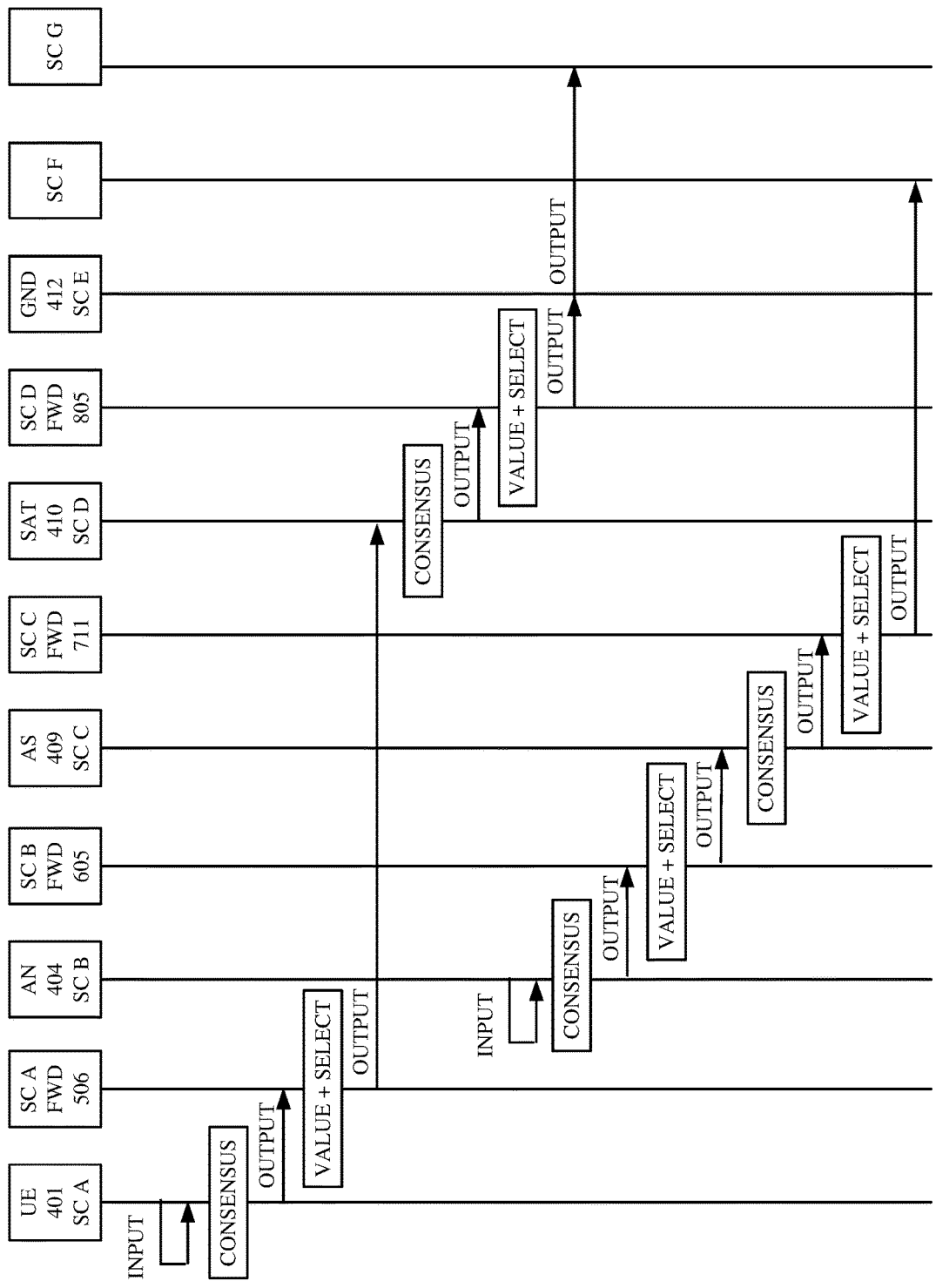
FIG. 13 illustrates an exemplary operation of the wireless communication system to filter the smart contract data.

FIG. 13 illustrates an exemplary operation of wireless communication system 400 to filter smart contract data. The operation may differ in other examples. SC A in UE 401 generates an SC A input. SC A reaches a consensus with other SC A nodes in DL 421 for an SC A output. SC A transfers the SC A output to SC A FWD 506 in UE 401. SC A FWD 506 generates a value for the other SC A output. In this example, the input comprises a vehicle velocity that was detected by UE 401. The SC A output comprises the vehicle velocity along with the verified location of UE 401. The vehicle velocity and location is designated as a "yes" value by a data structure in SC A FWD 506 based on the velocity and location as applied to a data structure. SC A FWD 506 selects target SC D in satellite 410 for the SC D output based on the velocity and location of UE 401. SC A FWD 506 forwards the SC A output to SC D in satellite 410.

SC D in satellite receives the SC A output as an SC D input. SC D reaches a consensus on an SC D output with other satellites in DL 424. SC D transfers the SC D output to SC D FWD 805 in satellite 410. SC D FWD 805 generates a value for the SC D output. In this example, the input comprises the vehicle velocity and location, and the output comprises a UE 401 identifier along with the velocity and location. The SC D output is scored as a "yes" based on the vehicle velocity exceeding a velocity threshold for the location. SC D FWD 805 selects target SC G for the SC D output based on the identity of UE 401 as applied to a data structure. SC F FWD 805 forwards the UE 401 identity, vehicle velocity, and location to SC G over ground station (GND) 412.

SC B in AN 404 generates an SC B input. SC B reaches a consensus with other SC B nodes in DL 422 for an SC B output. SC B transfers the SC B output to SC B FWD 605 in AN 404. SC B FWD 605 generates a value for the SC B output. In this example, the input comprises an identity and location of an aerial drone in communication with AN 404. The SC B output comprises the identity and location along with the altitude of the aerial drone. The location, identity, and altitude is designated as a "yes" value by a data structure in SC B FWD 605 based on the altitude as applied to a threshold for the location. SC B FWD 605 selects target SC C in AS 409 for the SC B output based on the identity of the aerial drone. SC B FWD 605 forwards the SC B output to SC C in AS 409.

SC C in AS 409 receives the SC B output as an SC C input. SC C reaches a consensus on an SC C output with other access nodes in DL 423. SC C transfers the SC C output to SC C FWD 711 in AS 409. SC C FWD 711 generates a value for the SC C output. In this example, the input comprises the aerial drone identity, location, and altitude and the output comprises wind speed and other weather data for the area occupied by the drone along with the aerial drone identity, location, and altitude. The SC C output is scored as a "yes" based on the identity of the aerial drone. SC C FWD 711 selects target SC F for the SC C output based on the identity of the aerial drone. SC C FWD 711 forwards the identity, location, altitude, wind speed and other data for the aerial drone to SC F.

The wireless communication system circuitry described above comprises computer hardware and software that form special-purpose wireless communication device circuitry to filter smart contract data. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless communication device circuitry to filter smart contract data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to filter smart contract data in wireless communication devices, the method comprising:
   in the wireless communication devices, generating source smart contract outputs;
   in the wireless communication devices, filtering the source smart contract outputs based on locations of the wireless communication devices to generate one or more filtered source smart contract outputs;
   in the wireless communication devices, selecting at least one target smart contract; and
   in the wireless communication devices, transferring the one or more filtered source smart contract outputs to the selected at least one target smart contract.

2. The method of claim 1 further comprising, in the wireless communication devices, wirelessly receiving source smart contract inputs and inputting the source smart contract inputs into the source smart contracts.

3. The method of claim 1 further comprising, in the wireless communication devices, generating source smart contract inputs and inputting the source smart contract inputs into the source smart contracts.

4. The method of claim 1 wherein the wireless communication devices comprise at least one distributed ledger.

5. The method of claim 1 wherein the wireless communication devices comprise wireless User Equipment (UEs).

6. The method of claim 1 wherein the wireless communication devices comprise wireless access nodes.

7. The method of claim 1 wherein one or more of the selected at least one target smart contract is executed in a satellite in earth orbit.

8. A method to filter smart contract data in wireless communication devices, the method comprising:
   in the wireless communication devices, executing source smart contracts and responsively generating source smart contract outputs;
   in the wireless communication devices, determining values for the source smart contract outputs based on locations of the wireless communication devices and responsively filtering the source smart contract outputs based on the values to generate one or more filtered source smart contract outputs;
   in the wireless communication devices, selecting target smart contracts for the one or more filtered source smart contract outputs; and
   in the wireless communication devices, transferring the one or more filtered source smart contract outputs for input into the selected target smart contracts.

9. The method of claim 8 further comprising, in the wireless communication devices, wirelessly receiving source smart contract inputs and inputting the source smart contract inputs into the source smart contracts.

10. The method of claim 8 further comprising, in the wireless communication devices, generating source smart contract inputs and inputting the source smart contract inputs into the source smart contracts.

11. The method of claim 8 wherein the wireless communication devices comprise distributed ledgers.

12. The method of claim 8 wherein the wireless communication devices comprise wireless User Equipment (UEs).

13. The method of claim 8 wherein the wireless communication devices comprise wireless access nodes.

14. The method of claim 8 wherein one or more of the selected at least one target smart contract is executed in a satellite in earth orbit.

15. A wireless distributed ledger system to filter smart contract data, the wireless distributed ledger system comprising:
   wireless communication devices configured to execute source smart contracts and responsively generate source smart contract outputs;
   the wireless communication devices further configured to determine values for the source smart contract outputs based on locations of the wireless communication devices and responsively filter the source smart contract outputs based on the values to generate one or more filtered source smart contract outputs;

the wireless communication devices further configured to select target smart contracts for the one or more filtered source smart contract outputs; and the wireless communication devices further configured to transfer the one or more filtered source smart contract outputs for input into the selected target smart contracts.

16. The wireless distributed ledger system of claim 15 wherein the wireless communication devices are further configured to wirelessly receive source smart contract inputs and input the source smart contract inputs into the source smart contracts.

17. The wireless distributed ledger system of claim 15 wherein the wireless communication devices are further configured to generate source smart contract inputs and input the source smart contract inputs into the source smart contracts.

18. The wireless distributed ledger system of claim 15 wherein the wireless communication devices comprise at least one wireless User Equipment (UE).

19. The wireless distributed ledger system of claim 15 wherein the wireless communication devices comprise wireless access nodes.

20. The wireless distributed ledger system of claim 15 wherein one or more of the selected at least one target smart contract is executed in a satellite in earth orbit.

* * * * *